No. 743,136. PATENTED NOV. 3, 1903.
J. G. BAUER.
WIRE WINDING MACHINE.
APPLICATION FILED APR. 24, 1903.
NO MODEL. 3 SHEETS—SHEET 1.

WITNESSES
INVENTOR
John G. Bauer
BY
ATTORNEYS.

No. 743,136. PATENTED NOV. 3, 1903.
J. G. BAUER.
WIRE WINDING MACHINE.
APPLICATION FILED APR. 24, 1903.
NO MODEL. 3 SHEETS—SHEET 2.

WITNESSES:

INVENTOR
John G. Bauer
BY
ATTORNEYS.

No. 743,136. PATENTED NOV. 3, 1903.
J. G. BAUER.
WIRE WINDING MACHINE.
APPLICATION FILED APR. 24, 1903.
NO MODEL. 3 SHEETS—SHEET 3.
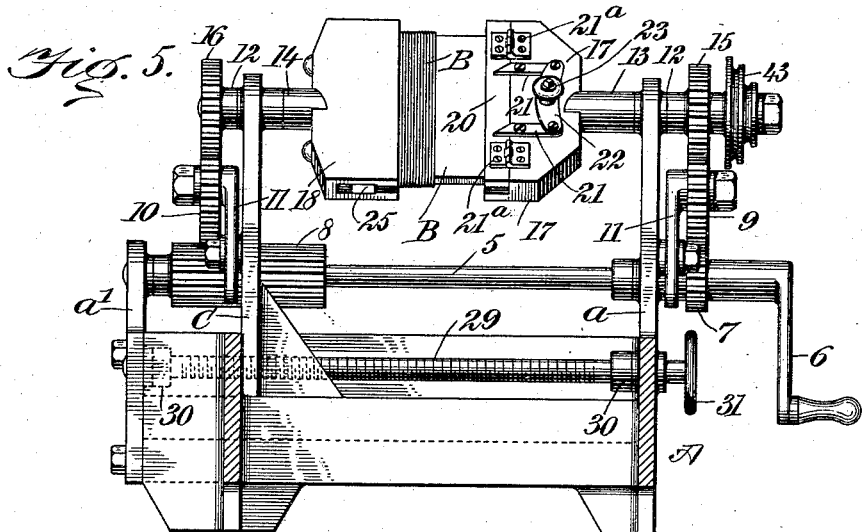
Fig. 5.
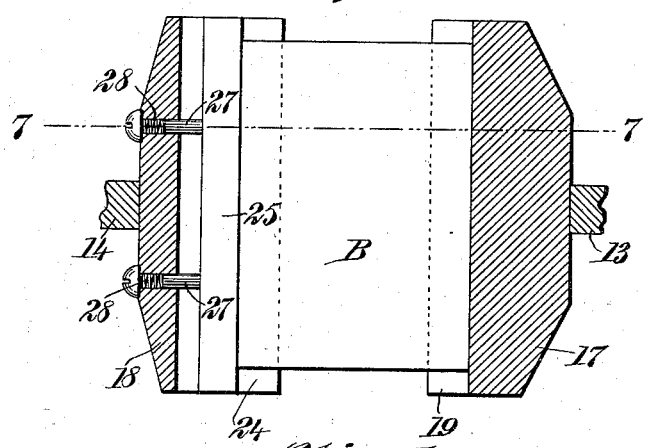
Fig. 6.
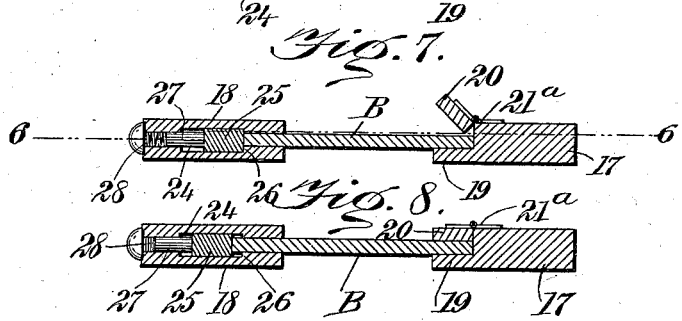
Fig. 7.
Fig. 8.
WITNESSES
A. C. Abbott
N. J. Bernhard
INVENTOR
John G. Bauer
BY Munn
ATTORNEYS.

No. 734,136.

Patented November 3, 1903.

UNITED STATES PATENT OFFICE.

JOHN G. BAUER, OF RAVENNA, OHIO.

WIRE-WINDING MACHINE.

SPECIFICATION forming part of Letters Patent No. 743,136, dated November 3, 1903.

Application filed April 24, 1903. Serial No. 154,165. (No model.)

*To all whom it may concern:*

Be it known that I, JOHN G. BAUER, a citizen of the United States, and a resident of Ravenna, in the county of Portage and State of Ohio, have invented a new and Improved Wire-Winding Machine, of which the following is a full, clear, and exact description.

My invention relates to improvements in wire-winding machines, the same being adapted for use in winding wire on carbon plates to produce brushes for use on electric motors and dynamos, although the machine may be employed to wind wire on other articles.

One object that I have in view is to provide a simple and effective machine by which the wire may be coiled snugly and regularly around the work, provision being made for effecting a variation in the spacing of the coils of the wire as may be desired.

Further objects are to equip the machine with means by which the head and tail stocks may be adjusted to suit work of different sizes, to provide an automatic stop for arresting the motion of the machine when the wire shall have been coiled the requisite distance on the work, and to provide for the easy introduction and removal of the work.

Further objects and advantages of the invention will appear in the course of the subjoined description, and the novelty will be defined by the annexed claims.

Reference is to be had to the accompanying drawings, forming a part of this specification, in which similar characters of reference indicate corresponding parts in all the figures.

Figure 1:
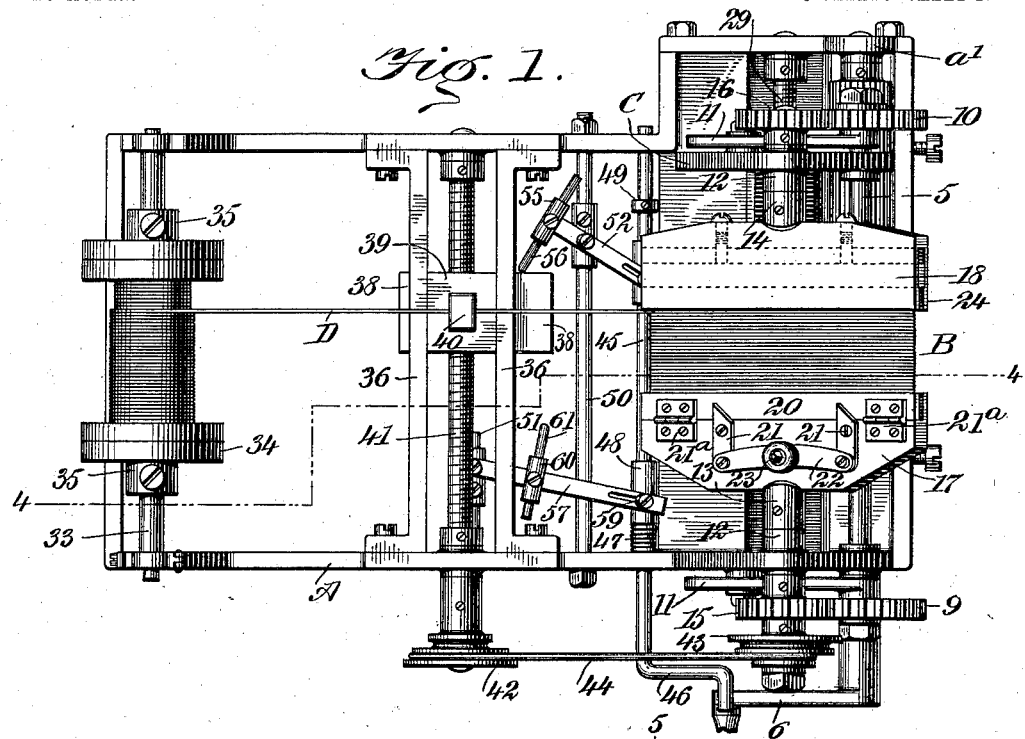
Figure 2:
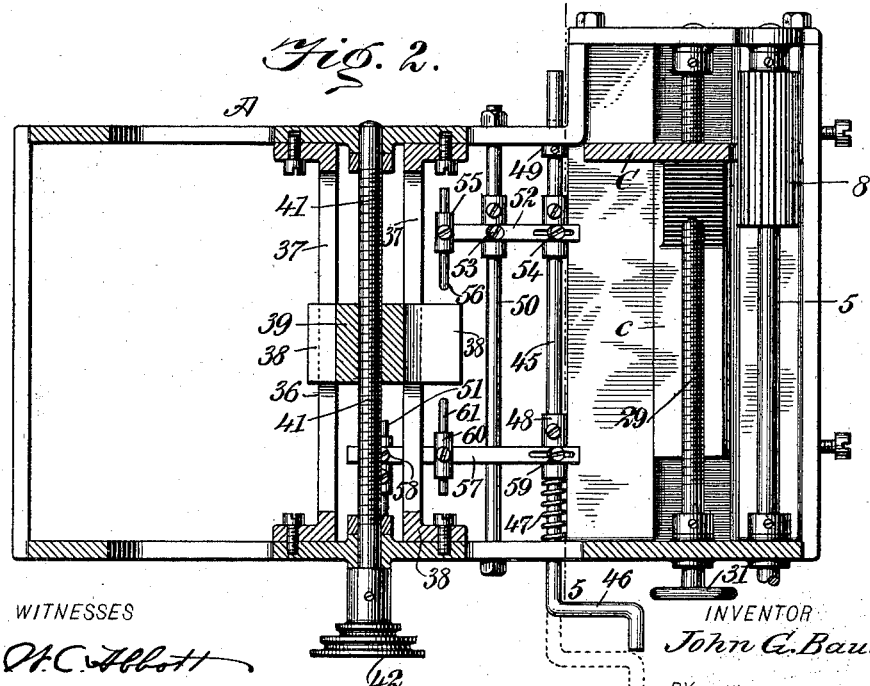
Figure 3:
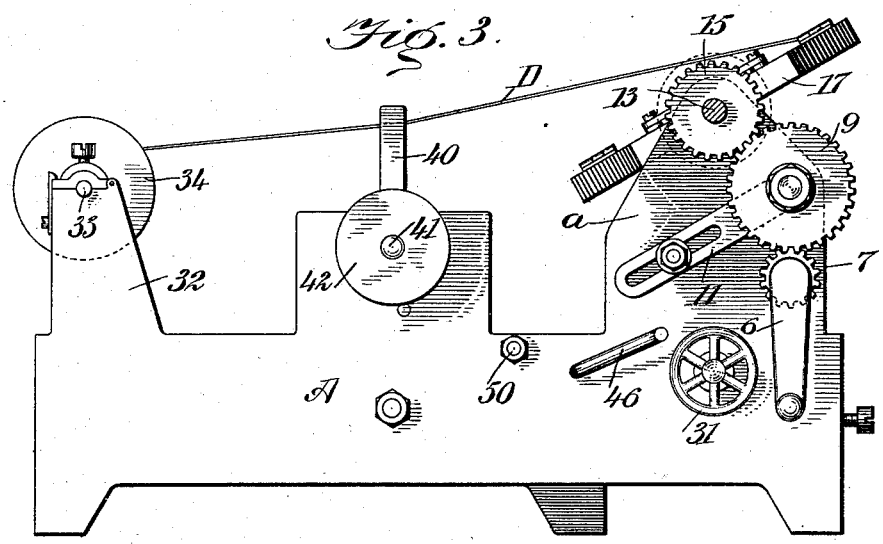
Figure 4:
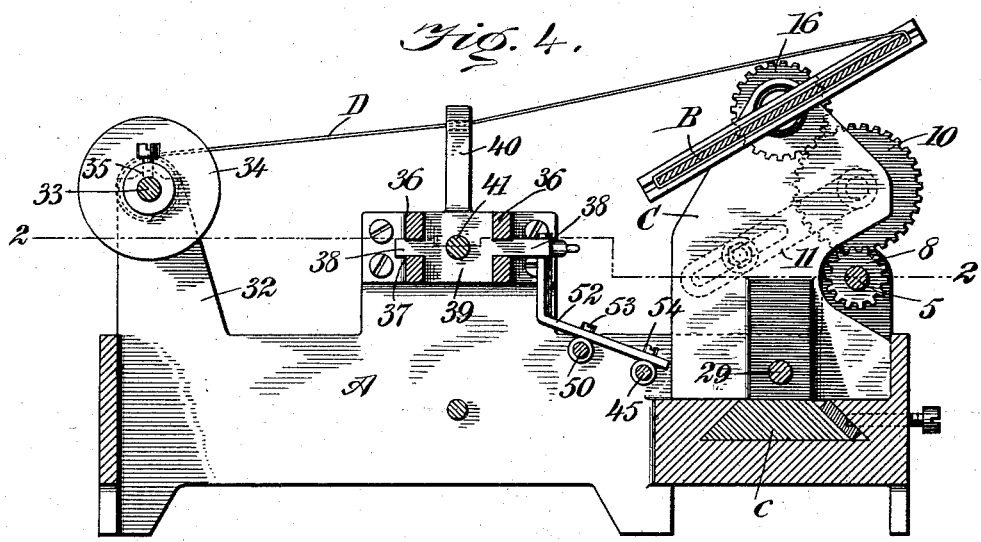

Figure 1 is a plan view of a wire-winding machine embodying my invention. Fig. 2 is a sectional plan view on the line 2 2 of Fig. 4. Fig. 3 is a side elevation looking at the crank side of the machine. Fig. 4 is a longitudinal section on the line 4 4 of Fig. 1. Fig. 5 is a transverse sectional elevation on the line 5 5 of Fig. 2. Fig. 6 is a detail sectional plan view through the coöperating work-holding heads, the plane of the section being indicated by the dotted line 6 6 of Fig. 7. Fig. 7 is a detail vertical section on the line 7 7 of Fig. 6; and Fig. 8 is a sectional view similar to Fig. 7, showing the parts in the position for holding the work.

A designates a suitable style of frame having a fixed upstanding member $a$ and a stationary bearing $a'$, said member $a$ being provided with a suitable bearing in line with the bearing $a'$ for the reception of a horizontal driving-shaft 5, the same being shown in the drawings as provided with a hand-crank 6 at one end, thus adapting the machine for operation by hand; but it is evident that the crank may be omitted and any suitable power appliance, such as a belt-pulley, may be fitted to said shaft for operating the machine by power. This shaft is provided near the crank with a gear-pinion 7, which lies on one side of the machine, and the other end portion of said shaft is provided with an elongated gear 8, said pinion 7 and the elongated gear meshing with intermediate gears 9 10, respectively. The intermediate gears are journaled on short stub-axles which are carried by slotted brackets 11, which are applied laterally to the upstanding frame member $a$ and to a cross-head C and are bolted adjustably thereto, as shown by Figs. 3 and 5. This frame member $a$ and the cross-head C are provided at their upper portions with suitable bearings 12 for the accommodation of short horizontal shafts 13 14, said shafts being disposed in the same horizontal plane and in coaxial relation, as shown by Figs. 1 and 5. These shafts are provided with gears 15 16, having intermeshing engagement with the gears 9 10, respectively, and said shafts carry the work-holding heads 17 18, said heads being disposed in opposing relation and adapted to receive the edge portions of the work between them.

The head 17 is provided at its inner edge with a longitudinal rabbet forming a continuous ledge or shoulder 19, as shown by Figs. 6, 7, and 8. A clamping-leaf 20 is hinged at 21ª to one face of the head 17, and this leaf is disposed in overhanging relation to the ledge or shoulder 19. When the leaf is closed to the position shown by Figs. 5 and 8, it coöperates with the ledge 19 in holding an edge portion of the work B in said head, and this leaf is adapted to be locked in its closed position by any suitable form of locking device—such, for example, as the pivoted latches 21, which are mounted on the head 17 and are connected by a slidable bar 22, the latter being pivoted to said latches and having a suitable thumb-piece 23 for its convenient manipulation by hand. The other head 18 is provided with a longitudinal recess or chamber 24, in which is housed a movable clamping-plate 25, the latter being limited in its outward movement by ledges or shoulders 26, which are provided in said chamber 24 of the head. (See Figs. 7 and 8.) The movable clamping-strip 25 is engaged by plungers or pins 27, which are normally impelled in one direction by coiled springs 28, thus forcing the plate 25 toward the inner edge of the chambered head 18.

In fitting the work B to the cutter-heads 17 18 the latches 21 are withdrawn from across the hinged leaf 20 by manipulating the slidable bar 22, thus allowing the leaf 20 to be raised to the position shown by Fig. 7. One edge of the work is now slipped into the chamber 24 of the head 18 to engage with the clamping-plate 25, while the other edge of said work is adjusted to rest on the shoulder 19, after which the leaf 20 is lowered and the bar 22 is operated to adjust the latches across said leaf. The work B is thus held securely in the two heads 17 18, which are rotated at equal speed by the trains of gearing from the shaft 5. This construction of the heads allows them to engage with the work in a way to rotate the latter without injury thereto, which is particularly desirable when winding "green" or undried carbon plates with wire, and the described construction is furthermore advantageous, because the work can be easily introduced into the heads and removed therefrom.

The cross-head C extends upwardly from a horizontal portion of the frame A, so as to lie parallel to the stationary frame member $a$, and this cross-head is fitted slidably to a dovetailed guide $c$ for movement across the machine-frame toward and from the member $a$, whereby the bracket 11, the gears 10 16, the shaft 14, and the work-head 18 may be moved toward and from the work-head 17 without throwing the head 18 out of gear, because the gear-wheel 10 will have meshing engagement with the elongated gear 8 on the driving-shaft 5. This construction provides for the adjustment of the head 18 and its cooperating parts toward and from the companion head 17 to accommodate the heads to pieces of work which vary in size. The cross-head C is adapted to be accurately adjusted by the employment of a screw-threaded hand-shaft 29, which is journaled in suitable bearings 30 on the frame A and has threaded engagement with the lower part of said cross-head C, one end of said shaft being provided with a hand-wheel 31 for its convenient manipulation.

At the opposite end of the machine-frame from the work-holding heads I provide the posts 32, having suitable bearings to accommodate the spool-shaft 33, which supports the wire spool or bobbin 34, the latter being held against displacement by suitable stop-collars 35. Between the spool-shaft 33 and the work-heads I provide the frame with a transverse traveler-guide, which is shown as consisting of horizontal fixed rails 36, secured to the side portions of said frame A. These rails 36 are provided with coincident slots 37 to receive the laterally-projecting flanges 38 of a horizontally-movable traveler 39, the latter being fitted between the rails 36 and confined for slidable movement by said rails and by having its flanges 38 fitted in said slots 37 of the companion rails. This traveler is provided with an upstanding guide-post 40, having an eye or passage adapted to permit the free movement of the wire D, adapted to be drawn from the spool 34 and to be supplied to the work B on the companion heads 17 18.

The traveler 39 is provided with a horizontal female-threaded passage adapted to have engagement with the screw-threads on a screw-shaft 41, the latter being journaled in suitable bearings on the side rails of the frame A, so as to extend between the guide rails 36. This shaft 41 thus engages with the traveler 39, the latter constituting practically a nut, which is held against rotary movement and is adapted by the rotary motion of the shaft to have rectilinear motion across the machine. Said threaded shaft 41 is adapted to be driven at different speeds by suitable gearing which connects the shaft operatively with the head-shaft 13, that carries the work-head 17. One style of gearing suitable for this purpose is shown by the drawings in the form of stepped pulleys 42 43, which are secured, respectively, to the screw-shaft 41 and to the head-shaft 13, each pulley having a series of grooves of different diameters and said pulleys being disposed in alined relation in order to receive an intermediate belt 44. It is evident that the belt may be changed on the pulleys 42 43 to drive the shaft 41 at different speeds in order that more or less layers of wire may be wound to the inch on the work B.

I have also equipped the machine with means for automatically arresting the motion of the shaft 5 when a single layer of wire shall have been wound to the desired limit on the work B. This stop mechanism contemplates the employment of a slidable bar or rod 45, which is mounted for endwise movement across the frame A in the side rails thereof, said slidable bar having an offset or angular end portion 46, which under certain conditions is adapted to be projected into the path of the operating-crank 6, substantially as shown by full and dotted lines in Figs. 1 and 2, respectively, of the drawings. This bar or rod is normally impelled in one direction by a coiled spring 47, so that the offset end 46 will be out of the path of the crank 6, said spring acting against a collar 48, which is clamped to the bar. A stop-collar 49 is also clamped to the bar to limit its movement in one direction under the energy of the spring 47. Adjacent to the slidable bar 45 is a stationary supporting-bar 50, which is secured to the side rails of the frame A, and a shorter supporting-bar 51 is also secured to one rail of the frame below the threaded shaft 41, as shown by Figs. 1 and 2. On the bar 50 is mounted a lever 52, having a fulcrum 53 and pivoted or loosely connected near one end at 54 to the slidable bar 45, the other end of said lever 52 having a socket 55, in which is adjustably clamped one of the stems 56 of the stop-motion. Another lever 57 is hung at 58 on the short rod 51, the opposite end of said lever having pivotal or loose connection at 59 with the slidable bar 45. This lever 57, which is fulcrumed at one end, is provided with a sleeve 60, in which is adjustably clamped the other stem 61 of the stop-motion. The stems 56 61 of the stop-motion are disposed on opposite sides of one flange 38 of the traveler, both of said stems lying in the path of said traveler in order to be actuated alternately thereby.

The operation of the machine may be described as follows: A spool of wire is fitted on the shaft or arbor 33, and the work B is placed in the heads 17 18 in the manner described. The wire is drawn from the spool through the upstanding post 40 and attached or fitted to the work in any suitable way, after which motion is imparted to the shaft 5 for the operation of the several mechanisms of the machine. The shaft 5 drives the two trains of gears to rotate the shafts 13 14 and the heads 17 18 at equal speed, and the belt 44 transmits the motion of the shaft 13 to the screw-shaft 41, the latter imparting the traversing motion to the follower 39. Assuming that the follower is in one position, the wire from the spool 34 is guided to the work, and owing to the rotary motion given to the work by the heads 17 18 the wire is coiled on said work, the spirals of the wire being laid side by side by the traversing motion given to the traveler. When the traveler reaches the limit of its movement toward the stem 61, the lever 57 is moved toward the left and slides the bar 45 against the tension of the spring 47, thereby moving the offset end 46 into the path of the crank 6 and stopping the machine. The wire may now be cut or detached, the work removed from the machine, and a fresh piece of work inserted in the heads, after which the shaft 5 should be turned in an opposite direction for the purpose of coiling the wire on the new piece of work. This opposite movement of the shaft drives the screw-shaft 41 in a reverse direction, so as to actuate the traveler 39 in a similar direction. As this traveler reaches the limit of its movement in the described direction it impinges the stem 56, which moves the lever 52 and impels the bar 45 in the same direction that it was moved by the lever 57, thereby again interposing the offset end 46 in the path of the crank and stopping the motion of the machine when the wire is coiled to the full limit on the work. It will be understood that the levers 52 and 57 may be adjusted on the stationary rods 45 and 51 and that the stems 56 61 may be adjusted in their sockets to accommodate the traveler 39 to different lengths of traversing movement, thus bringing the operation of the traveler into harmony with the width of the work held in the heads 17 18.

Having thus described my invention, I claim as new and desire to secure by Letters Patent—

1. In a wire-winding machine, the combination of independent shafts having heads revoluble therewith, a single driving-shaft, trains of gears connecting said shaft with the head-carrying shafts for rotating the latter at uniform speed, a traveler, and means for imparting a traversing movement to said traveler from the driving-shaft.

2. A wire-winding machine having a pair of companion heads one of which is provided with a means for holding the work, and the other head having work-clamping means, combined with means for rotating the heads at equal speed, and a traveler capable of a traversing movement with respect to the heads.

3. In a wire-winding machine, a pair of companion heads, one of which is provided with a spring-controlled clamping-bar and the other having a movable clamping-leaf, and means for locking said leaf in its operative position.

4. In a wire-winding machine, a pair of companion heads, one of which is provided with a chamber and a movable clamping-bar therein, the other head being provided with a pivoted leaf, and means for locking said leaf in its operative position.

5. In a wire-winding machine, the combination with a head, of a cross-head adjustable relatively to said head, another head carried by said adjustable cross-head, and means for rotating the two heads at uniform speed.

6. In a wire-winding machine, the combination with a revoluble work-head, of a cross-head, means for adjusting said cross-head toward and from the revoluble head, another revoluble head carried by said cross-head, a driving-shaft geared to the first-named revoluble head and having an elongated pinion, and a train of gears mounted on the cross-head, one of said gears having intermeshing engagement with said elongated pinion.

7. In a wire-winding machine the combination with revoluble work-heads, of stationary guides, a traveler fitted slidably to said guides, a post carried by said traveler, a threaded shaft engaged with said traveler, and means for rotating said threaded shaft.

8. In a wire-winding machine, the combination with a driving-shaft, and revoluble work-heads operated thereby, of a threaded shaft arranged to actuate a traveler, and automatic stop devices for arresting the driving-shaft, and controllable by the traversing movement of said traveler.

9. In a wire-winding machine, the combination with a traveler, revoluble heads, and a driving-shaft geared to said heads, of a slidable locking-bar having means for engagement with said driving-shaft, independent levers connected with said locking-bar, a spring for moving said bar in one direction, and stems carried by said levers and disposed in the path of the traveler.

In testimony whereof I have signed my name to this specification in the presence of two subscribing witnesses.

JOHN G. BAUER.

Witnesses:
G. W. PITZ,
JOHN H. DUSSEL.